US 9,402,154 B2

(12) United States Patent
Houri

(10) Patent No.: US 9,402,154 B2
(45) Date of Patent: Jul. 26, 2016

(54) METHODS FOR PROVIDING LOCATION OF WIRELESS DEVICES USING WI-FI

(71) Applicant: TruePosition, Inc., Berwyn, PA (US)

(72) Inventor: Cyril Houri, Miami Beach, FL (US)

(73) Assignee: TruePosition, Inc., Berwyn, PA (US)

( * ) Notice: Subject to any disclaimer, the term of this patent is extended or adjusted under 35 U.S.C. 154(b) by 0 days.

(21) Appl. No.: 14/451,006

(22) Filed: Aug. 4, 2014

(65) Prior Publication Data

US 2014/0342756 A1   Nov. 20, 2014

Related U.S. Application Data

(63) Continuation of application No. 12/172,415, filed on Jul. 14, 2008, which is a continuation-in-part of (Continued)

(51) Int. Cl.
*H04W 4/02* (2009.01)
*G01S 5/02* (2010.01)
*G06F 17/30* (2006.01)

(52) U.S. Cl.
CPC .............. *H04W 4/021* (2013.01); *G01S 5/0252* (2013.01); *G01S 5/0263* (2013.01); *G06F 17/3087* (2013.01)

(58) Field of Classification Search
USPC ....................................................... 455/456.3
See application file for complete search history.

(56) References Cited

U.S. PATENT DOCUMENTS 5,185,860 A   2/1993   Wu
5,461,390 A   10/1995  Hoshen (Continued)

FOREIGN PATENT DOCUMENTS

WO   WO-03/021851 A2   3/2003
WO   WO-2005/088991 A1  9/2005

(Continued)

OTHER PUBLICATIONS

Chawathe, Yatin et al., "A Case Study in Building Layered DHT Applications", Intel Research Seattle, University of California, San Diego, Intel Research Berkeley, ICSI, Jan. 2005, pp. 1-15.

(Continued)

*Primary Examiner* — Kent Chang
*Assistant Examiner* — Chayce Bibbee
(74) *Attorney, Agent, or Firm* — Cesari and McKenna, LLP; James A. Blanchette

(57) ABSTRACT

Method includes maintaining a collaborative database on a database server containing geographic location information pertaining to Wi-Fi access points. The collaborative database includes database records for Wi-Fi access points including a MAC address and geographic location. A position location request from a Wi-Fi enabled wireless device is received at a server, and includes a respective MAC address of at least one Wi-Fi access point for which a wireless beacon is detected by the wireless device. Via a query issued to the database server using at least one MAC address included in the position location request, geographic location data for one or more Wi-Fi access points is retrieved from the database. A processor determines geographic location of the wireless device based at least on the retrieved geographic location data, and returns, via the server, geographic location data to the wireless device corresponding to the geographic location of the wireless device.

30 Claims, 7 Drawing Sheets

Related U.S. Application Data application No. 11/549,703, filed on Oct. 16, 2006, now Pat. No. 7,696,923, which is a continuation-in-part of application No. 11/170,337, filed on Jun. 29, 2005, now Pat. No. 7,397,424, said application No. 12/172,415 is a continuation-in-part of application No. 12/167,649, filed on Jul. 3, 2008, now Pat. No. 8,565,788, which is a continuation-in-part of application No. 11/170,337, filed on Jun. 29, 2005, now Pat. No. 7,397,424.

(60) Provisional application No. 60/649,180, filed on Feb. 3, 2005.

(56) References Cited

U.S. PATENT DOCUMENTS

| | | | |
|---|---|---|---|
| 5,675,741 | A | 10/1997 | Aggarwal et al. |
| 5,825,283 | A | 10/1998 | Camhi |
| 5,835,720 | A | 11/1998 | Nelson et al. |
| 5,918,181 | A | 6/1999 | Foster et al. |
| 5,944,790 | A | 8/1999 | Levy |
| 5,948,055 | A | 9/1999 | Pulsipher et al. |
| 5,948,061 | A | 9/1999 | Merriman et al. |
| 6,047,234 | A | 4/2000 | Cherveny et al. |
| 6,134,448 | A | 10/2000 | Shoji et al. |
| 6,151,631 | A | 11/2000 | Ansell et al. |
| 6,289,341 | B1 | 9/2001 | Barney |
| 6,377,987 | B1 | 4/2002 | Kracht |
| 6,412,014 | B1 | 6/2002 | Ryan |
| 6,425,007 | B1 | 7/2002 | Messinger |
| 6,438,491 | B1 | 8/2002 | Farmer |
| 6,507,869 | B1 | 1/2003 | Franke et al. |
| 6,508,710 | B1 | 1/2003 | Paravia et al. |
| 6,639,516 | B1 | 10/2003 | Copley |
| 6,665,715 | B1 | 12/2003 | Houri |
| 6,718,176 | B2 | 4/2004 | Michaud et al. |
| 6,768,450 | B1 | 7/2004 | Walters et al. |
| 6,799,049 | B1 | 9/2004 | Zellner et al. |
| 6,847,892 | B2 | 1/2005 | Zhou et al. |
| 6,919,842 | B2 | 7/2005 | Cho |
| 6,925,378 | B2 | 8/2005 | Tzamaloukas |
| 7,000,015 | B2 | 2/2006 | Moore et al. |
| 7,039,427 | B2 | 5/2006 | Tachikawa |
| 7,042,391 | B2 | 5/2006 | Meunier et al. |
| 7,050,787 | B2 | 5/2006 | Caci |
| 7,076,365 | B2 | 7/2006 | Tzamaloukas |
| 7,092,943 | B2 | 8/2006 | Roese et al. |
| 7,106,717 | B2 | 9/2006 | Rousseau et al. |
| 7,130,630 | B1 | 10/2006 | Enzmann et al. |
| 7,139,820 | B1 | 11/2006 | O'Toole et al. |
| 7,155,238 | B2 | 12/2006 | Katz |
| 7,177,651 | B1 | 2/2007 | Almassy |
| 7,231,218 | B2 | 6/2007 | Diacakis et al. |
| 7,319,878 | B2 | 1/2008 | Sheynblat et al. |
| 7,349,702 | B2 | 3/2008 | Graumann |
| 7,353,034 | B2 | 4/2008 | Haney |
| 7,363,024 | B2 | 4/2008 | Jenkins |
| 7,389,114 | B2 | 6/2008 | Ju et al. |
| 7,397,424 | B2 | 7/2008 | Houri |
| 7,414,988 | B2 | 8/2008 | Jones et al. |
| 7,433,695 | B2 | 10/2008 | Gordon et al. |
| 7,440,755 | B2 | 10/2008 | Balachandran et al. |
| 7,466,986 | B2 | 12/2008 | Halcrow et al. |
| 7,471,954 | B2 | 12/2008 | Brachet et al. |
| 7,474,897 | B2 | 1/2009 | Morgan et al. |
| 7,475,897 | B2 | 1/2009 | Wang |
| 7,493,127 | B2 | 2/2009 | Morgan et al. |
| 7,647,164 | B2 | 1/2010 | Reeves |
| 7,696,923 | B2 | 4/2010 | Houri |
| 7,751,828 | B2 | 7/2010 | Kim et al. |
| 8,121,620 | B2 | 2/2012 | Kim et al. |
| 8,565,788 | B2 | 10/2013 | Houri |
| 2002/0090956 | A1 | 7/2002 | Otsuka et al. |
| 2003/0069693 | A1 | 4/2003 | Snapp et al. |
| 2003/0073440 | A1 | 4/2003 | Mukherjee et al. |
| 2003/0100294 | A1 | 5/2003 | Hosono |
| 2003/0105818 | A1 | 6/2003 | Lapstun et al. |
| 2003/0125042 | A1 | 7/2003 | Olrik et al. |
| 2003/0194993 | A1 | 10/2003 | Fomukong |
| 2003/0211853 | A1 | 11/2003 | Banno |
| 2004/0087317 | A1 | 5/2004 | Caci |
| 2004/0132465 | A1 | 7/2004 | Mattila et al. |
| 2004/0166879 | A1 | 8/2004 | Meadows et al. |
| 2004/0174264 | A1 | 9/2004 | Reisman et al. |
| 2004/0174297 | A1 | 9/2004 | Cho |
| 2004/0180645 | A1 | 9/2004 | Bussan et al. |
| 2004/0198398 | A1 | 10/2004 | Amir et al. |
| 2004/0203603 | A1 | 10/2004 | Pierce et al. |
| 2004/0203903 | A1 | 10/2004 | Wilson et al. |
| 2004/0203926 | A1 | 10/2004 | Ruutu et al. |
| 2004/0214550 | A1 | 10/2004 | Jenkins |
| 2004/0230370 | A1 | 11/2004 | Tzamaloukas |
| 2004/0230374 | A1 | 11/2004 | Tzamaloukas |
| 2004/0266457 | A1 | 12/2004 | Dupray |
| 2005/0037775 | A1 | 2/2005 | Moeglein et al. |
| 2005/0070309 | A1 | 3/2005 | Caspi et al. |
| 2005/0105600 | A1 | 5/2005 | Culum et al. |
| 2005/0135292 | A1 | 6/2005 | Graumann |
| 2005/0136845 | A1 | 6/2005 | Masuoka et al. |
| 2005/0164704 | A1 | 7/2005 | Winsor |
| 2005/0186969 | A1 | 8/2005 | Lohtia |
| 2005/0202830 | A1 | 9/2005 | Sudit |
| 2005/0212700 | A1 | 9/2005 | Diggelen et al. |
| 2005/0227689 | A1 | 10/2005 | Jewett |
| 2005/0251326 | A1 | 11/2005 | Reeves |
| 2005/0278758 | A1 | 12/2005 | Bodlaender |
| 2005/0282558 | A1 | 12/2005 | Choi et al. |
| 2006/0030339 | A1 | 2/2006 | Zhovnirovsky et al. |
| 2006/0046749 | A1 | 3/2006 | Pomerantz et al. |
| 2006/0095349 | A1* | 5/2006 | Morgan et al. ............... 705/29 |
| 2006/0170591 | A1 | 8/2006 | Houri |
| 2006/0183486 | A1 | 8/2006 | Mullen |
| 2006/0200843 | A1* | 9/2006 | Morgan et al. ............... 725/80 |
| 2006/0224319 | A1 | 10/2006 | Rogers |
| 2006/0271517 | A1 | 11/2006 | Deloach, Jr. |
| 2007/0121560 | A1 | 5/2007 | Edge |
| 2008/0186162 | A1 | 8/2008 | Rajan et al. |
| 2008/0274752 | A1 | 11/2008 | Houri |
| 2009/0197612 | A1 | 8/2009 | Kiiskinen |
| 2011/0015858 | A1 | 1/2011 | Takagi et al. |

FOREIGN PATENT DOCUMENTS

| | | |
|---|---|---|
| WO | WO-2007/056738 A2 | 5/2007 |
| WO | WO-2008017830 A1 | 2/2008 |

OTHER PUBLICATIONS

Cheng, Yu-Chung et al., "Accuracy Characterization for Metropolitan-scale Wi-Fi Localization," Proceedings of Mobisys 2005University of California, San Diego; Intel Research Seattle; Intel Corporation, Jan. 2005, pp. 1-13.

Hong, by Jason I., et al., Privacy and Security in the Location-enhanced World Wide Web, Proceedings of Ubicomp 2003, Seattle, WA, Oct. 2003, pp. 1-5.

Komar, C., et al., "Location Tracking and Location Based Service Using IEEE 802.11 WLAN Infrastructure," Proceedings of the European Wireless Workshop, Feb. 24-27, 2004, pp. 1-7.

Lamarca, Anthony et al. Place Lab: Device Positioning Using Radio Beacons in the Wild, Pervasive 2005, Munich, Germany, pp. 1-18.

Schilit, Bill N. et al., "Challenge: Ubiquitous Location-Aware Computing and the Place Lab" WMASH'03, Initiative, Proceedings of the First ACM International Workshop on Wireless Mobile Applications and Services on WLAN Hotspots, Sep. 19, 2003, pp. 1-7.

Smith, Ian, et al., "Social Disclosure of Place: From Location Technology to Communication Practices," Pervasive 2005, Munich, Germany, pp. 1-18.

* cited by examiner

FIG. 2
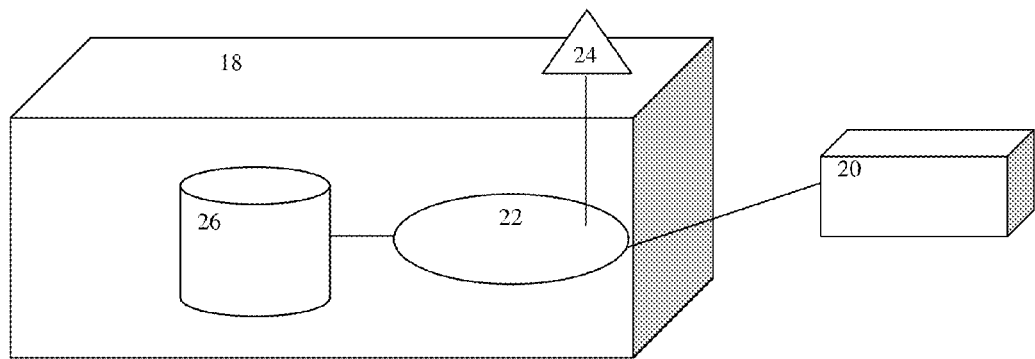
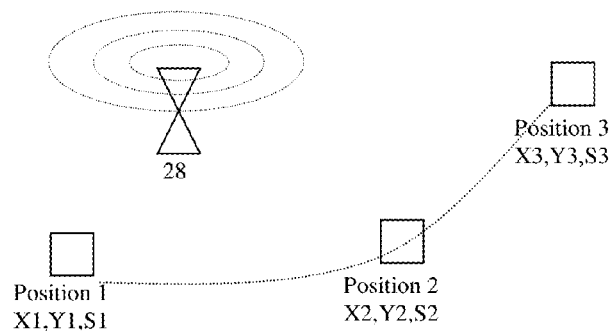
FIG. 3

METHODS FOR PROVIDING LOCATION OF WIRELESS DEVICES USING WI-FI

CROSS REFERENCE TO RELATED APPLICATIONS

This application is a continuation of U.S. patent application Ser. No. 12/172,415 filed Jul. 14, 2008 which is:

1) a continuation-in-part of U.S. patent application Ser. No. 11/549,703 filed Oct. 16, 2006, now U.S. Pat. No. 7,696,923, which is a continuation-in-part of U.S. patent application Ser. No. 11/170,337 filed Jun. 29, 2005, now U.S. Pat. No. 7,397,424, which claims priority under 35 U.S.C. §119(e) of U.S. provisional patent application Ser. No. 60/649,180 filed Feb. 3, 2005, now expired; and 2) a continuation-in-part of U.S. patent application Ser. No. 12/167,649 filed Jul. 3, 2008, now U.S. Pat. No. 8,565,788, which is a continuation-in-part of U.S. patent application Ser. No. 11/170,337 filed Jun. 29, 2005, now U.S. Pat. No. 7,397,424, which claims priority under 35 U.S.C. §119(e) of U.S. provisional patent application Ser. No. 60/649,180 filed Feb. 3, 2005, now expired.

All of the above applications are incorporated by reference herein.

FIELD OF THE INVENTION

The present invention relates generally to methods for providing geographic location of wireless devices using Wi-Fi access points.

BACKGROUND OF THE INVENTION

As portable mobile devices proliferate, there is a growing demand to continuously and accurately know the geographic location of the mobile devices. There are basically two different ways to determine the geographic locations of a mobile device, either using a wireless positioning network such the GPS system or using a database of wireless beacons and determining position using this database.

The first technique suffers from the difficulty in continuously obtaining signals, e.g., from a network of satellite, to enable the position of the mobile device to be determined. It is recognized that such difficulties commonly arise in enclosed areas and confined areas, such as in areas with a large concentration of tall buildings and in tunnels.

The second technique requires the creation of a database of wireless beacons, and the mobile device to be within range of a plurality of such wireless beacons. In the absence of wireless beacons within range, the position of the mobile device cannot be determined.

For the second technique, several systems are being used to enable mobile devices to determine their position. One such system is Place Lab. Place Lab is software providing low-cost, easy-to-use device positioning for location-enhanced computing applications. The Place Lab approach is to allow mobile devices such as notebook computers, PDAs and cell phones, to locate themselves by listening for radio beacons such as 802.11 access points, GSM cell phone towers, and fixed Bluetooth devices that exist in the surrounding environment. These beacons all have essentially unique identifications, for example, a MAC address. The devices compute their own location by hearing one or more IDs, looking up the associated beacons' positions in a stored map, and estimating their own position referenced to the beacons' positions. Additional information about Place Lab is found in: Place Lab: Device Positioning Using Radio Beacons in the Wild, by Anthony LaMarca et al., Pervasive 2005, Munich, Germany; Challenge: Ubiquitous Location-Aware Computing and the "Place Lab" Initiative, by Bill N. Schilit et al., Proceedings of The First ACM International Workshop on Wireless Mobile Applications and Services on WLAN (WMASH 2003), San Diego, Calif. September 2003; A Case Study in Building Layered DHT Applications, by Yatin Chawathe et al., January 2005; Accuracy Characterization for Metropolitan-scale Wi-Fi Localization, by Yu-Chung Cheng et al., Proceedings of Mobisys 2005, January 2005; Social Disclosure of Place: From Location Technology to Communication Practices, by Ian Smith et al., Pervasive 2005, Munich, Germany; and Privacy and Security in the Location-enhanced World Wide Web, by Jason I. Hong et al., Proceedings of Ubicomp 2003, Seattle, Wash. October 2003.

Another positioning system is that of Skyhook Wireless which uses a database of known Wi-Fi access points to calculate the precise location of any Wi-Fi enabled device. For this system, known Wi-Fi networks are mapped, e.g., by having hired drivers travel every street in a neighborhood, and a user's location is calculated based on the Wi-Fi networks the Wi-Fi enabled device detects at a given moment using proprietary software. If the device can identify three networks, it can determine its position, e.g., using triangulation. The more networks the device detects simultaneously, the more accurate the locational fix.

SUMMARY OF THE INVENTION

A method in accordance with the invention includes maintaining a collaborative database on a database server containing geographic location information pertaining to Wi-Fi access points. The collaborative database includes database records for each of a plurality of Wi-Fi access points including a MAC address and geographic location of the Wi-Fi access point. At least a portion of the database records are based on Wi-Fi identification and geographic location data received from a plurality of Wi-Fi- and GPS-enabled wireless devices such that the collaborative database is built in a collaborative manner. Further, the method includes receiving, at a server, a position location request from a wireless device that is Wi-Fi enabled, the position location request including a respective MAC address of at least one Wi-Fi access point for which a wireless beacon is detected by the wireless device. The method also includes retrieving, via a query issued to the database server using at least one MAC address included in the position location request, geographic location data for at least one of the Wi-Fi access points from the collaborative database. The method further includes determining, via a processor, a geographic location of the wireless device based at least on the geographic location data retrieved from the collaborative database, and returning, via the server, geographic location data to the wireless device corresponding to the geographic location of the wireless device that is determined.

The geographic location data may include a latitude and longitude value. The wireless device may comprises or be a cell phone. The method may also include providing software configured to be executed on a Wi-Fi enabled wireless device. The software, upon execution, preferably enables the Wi-Fi enabled wireless device to identify a MAC address for at least one Wi-Fi access point transmitting a wireless beacon that is received by the Wi-Fi enabled wireless device, generate a position location request including a respective MAC address for each of the at least one Wi-Fi access point transmitting a wireless beacon for which a MAC address is identified, and send the position location request to a server configured to facilitate access to the collaborative database. The software may be further configured, upon execution, to enable a user of the Wi-Fi enabled wireless device to cause the Wi-Fi enabled wireless device to generate and send a position location request to the server in response to selection of an icon by the user.

Another method in accordance with the invention includes maintaining a collaborative database on a server system containing geographic location information pertaining to Wi-Fi access points, the collaborative database may be as described above, and receiving, at the server system, a position location request from a wireless device that is Wi-Fi enabled. The position location request includes a respective MAC address of at least one Wi-Fi access point for which a wireless beacon is detected by the wireless device. The method also includes retrieving, via a query issued to the server system using at least one MAC address included in the position location request, geographic location data for at least one of the Wi-Fi access points from the collaborative database, and determining, via a processor, a geographic location of the wireless device based at least on the geographic location data retrieved from the collaborative database. The method further includes returning, via the server system, geographic location data to the wireless device corresponding to the geographic location of the wireless device that is determined. Variations to this method may be as described above.

Still another method in accordance with the invention includes receiving at a database server, first Wi-Fi access point location data from a first wireless device that is GPS-enabled and Wi-Fi-enabled. The first Wi-Fi access point location data includes GPS location data generated by the first wireless device, and a MAC address of a first Wi-Fi access point for which a wireless beacon is detected by the first wireless device. The method also includes processing, via a processor, the first Wi-Fi access point location data to generate geographic location data for the first Wi-Fi access point, adding the geographic location data and MAC address of the first Wi-Fi access point to a collaborative database containing Wi-Fi access point location data, and receiving, at a server, a position location request from a second wireless device that is Wi-Fi enabled. This position location request includes a MAC address of the first Wi-Fi access point for which a wireless beacon is detected by the second wireless device. The method further includes retrieving via a query issued to the database server, geographic location data for the first Wi-Fi access point from the collaborative database, and determining, via a processor, a geographic location of the second wireless device based at least on the geographic location data for the first Wi-Fi access point. Finally, the method includes returning, via the server, geographic location data to the second wireless device corresponding to the geographic location determined for the second wireless device.

The geographic location data may include a latitude and longitude value. Each of the first and second wireless devices may comprise or are cell phones. The method may also include providing software configured to be executed on the first wireless device. The software, upon execution, preferably enables the first wireless device to identify a MAC address for at least one Wi-Fi access point transmitting a wireless beacon that is received by the Wi-Fi enabled wireless device, determine a geographic location of the first wireless device through use of GPS facilities provided by the first wireless device, generate the first Wi-Fi access point location data, and send the first Wi-Fi access point location data to a server configured to facilitate access to the collaborative database.

Addition of the geographic location data and MAC address of the first Wi-Fi access point to the collaborative database may be performed only when the geographic location data and MAC address of the first Wi-Fi access point is not already present in the collaborative database.

Another method in accordance with the invention includes receiving, at a database server from each of a plurality of GPS-enabled and Wi-Fi-enabled wireless devices, respective sets of Wi-Fi access point location data. Each set of Wi-Fi access point location data includes for each Wi-Fi access point from which a wireless beacon transmitted from a Wi-Fi access point is detected by the GPS-enabled and Wi-Fi-enabled wireless device, a MAC address of the Wi-Fi access point, and GPS location data generated by the GPS-enabled and Wi-Fi-enabled wireless device. For each of at least a portion of the respective sets of Wi-Fi access point location data that is received, the method includes processing, via a processor, data in the set of Wi-Fi access point location data to generate geographic location data for at least one Wi-Fi access point having a MAC address included in the set of Wi-Fi access point location data, and adding the geographic location data and MAC address of the at least one Wi-Fi access point to a collaborative database containing Wi-Fi access point location data.

The method may also include receiving, via a server, a position location request from a requesting wireless device that is Wi-Fi enabled. The position location request includes a MAC address corresponding to at least one Wi-Fi access point for which a wireless beacon is detected by the requesting wireless device. In response to receiving the position location request, the method entails retrieving geographic location data from the collaborative database for at least one Wi-Fi access point for which a MAC address is provided in the position location request, and determining, via a processor, a geographic location of the requesting wireless device based at least on the geographic location data for the at least one Wi-Fi access point. The method also includes returning, via the server, geographic location data to the requesting wireless device corresponding to the geographic location determined for the requesting wireless device.

In one embodiment, the method entails receiving, at the database server from a GPS-enabled and Wi-Fi-enabled wireless device, a set of Wi-Fi access point location data including a MAC address for a Wi-Fi access point transmitting a wireless beacon received by the GPS-enabled and Wi-Fi-enabled wireless device. For each of a plurality of geographic locations, also received are GPS-measured coordinates, generated by the GPS-enabled and Wi-Fi-enabled wireless device, and at least one signal strength measurement of a wireless beacon transmitted from the Wi-Fi access point measured by the GPS-enabled and Wi-Fi-enabled wireless device. The method then preferably includes processing, via the processor, data in the set of Wi-Fi access point location data to generate geographic location data for the Wi-Fi access point, and adding the geographic location data and MAC address of the Wi-Fi access point to the collaborative database.

Addition of the geographic location data and MAC address of each Wi-Fi access point to the collaborative database may be performed only when the geographic location data and MAC address of the Wi-Fi access point is not already present in the collaborative database.

Other and further objects, advantages and features of the present invention will be understood by reference to the following specification in conjunction with the annexed drawings, wherein like parts have been given like numbers.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 2 is a schematic showing a scanner used to create a database of wireless beacons in accordance with the invention.

FIG. 3 is an illustration of multiple scanner readings obtained to create the database of wireless beacons.

DETAILED DESCRIPTION OF THE INVENTION

Figure 1:
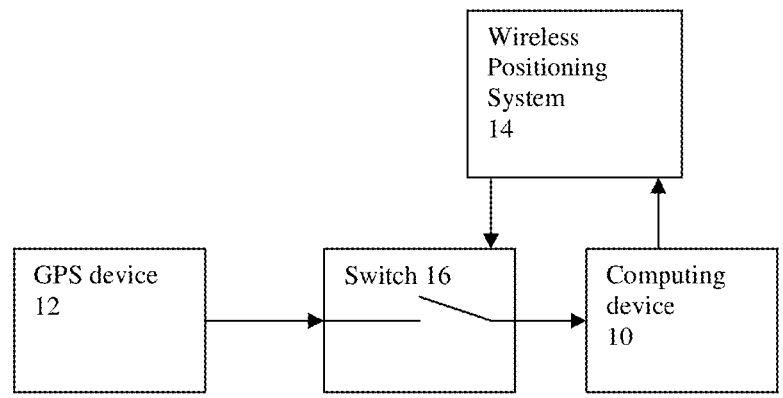
FIG. 1 is a schematic of a general concept used in the invention for enabling position of a mobile device to be determined.

Referring first to FIG. 1, to provide a system and method for enabling a mobile device to determine its position using a wireless and/or satellite-based positioning system irrespective of the reception of positioning signals therefrom by the mobile device, each mobile device 10 is coupled to a wireless or satellite-based positioning systems such as a GPS device 12 such that the mobile device 10 and GPS device 12 are effectively collocated. Using positional data provided by the GPS device 12 and data about wireless beacons, Wi-Fi access points, cell phone towers or other comparable systems (hereinafter referred to as beacons) within reception range of the mobile device 10, the mobile device 10 creates a database of wireless beacons within a wireless positioning system 14 including the geographic location of each beacon (the exact manner in which such a database is formed is described below).

A software switch 16 is interposed between the GPS device 12 and the mobile device 10 to vary the manner in which a determination by the mobile device 10 of its position is made. Specifically, when the GPS device 12 receives an accurate positioning signal, switch 16 would allow this GPS signal to be directed to the mobile device 10 so that the mobile device would consider its position that determined by the GPS signal. On the other hand, when the GPS device 12 is unable to provide an accurate GPS signal, switch 16 would allow a positioning signal derived from the wireless positioning system 14, and based on input from the mobile device 10 at that time, to be directed to the mobile device 10 and the mobile device 10 would consider its position that indicated by this positioning signal.

Switch 16 would operate to revert back to allowing a GPS signal from GPS device 12 to be directed to mobile device 10 once GPS device 12 provides an accurate GPS signal. Accuracy of the GPs signal can be made in a manner known to those skilled in the art.

Accordingly, the mobile device 10 would be able to continuously know its position even in the absence of an accurate GPS signal. The mobile device 10 could be designed to indicate the source of its positioning signal, e.g., an icon on a screen thereof could indicate either a satellite-derived signal (a signal from GPS device 12) or a database-derived signal (a positioning signal from wireless positioning system 14).

Although represented as separate elements in FIG. 1, this is for the purposes of explanation only and it should be understood that mobile device 10 can include wireless positioning system 14 and switch 16 can be software implemented in the mobile device 10. Moreover, GPS device 12 can also be incorporated into the mobile device 10 so that a single handheld or portable unit could include the entire system in accordance with this embodiment of the invention.

The database of wireless beacons in wireless positioning system 14 can be considered a map which associates the fixed physical location of each wireless beacon, i.e., where they are geographically located, with a unique or semi-unique identification code of each wireless beacon. The location of each beacon can be expressed, for example, by latitude and longitude, or possibly by another coordinate system.

Construction of such a map may be accomplished in a variety of ways, the simplest but most labor intensive being to place a positioning device, e.g., a GPS device, at the same location of each wireless beacon to thereby obtain the physical location of the wireless beacon from the GPS device. This however is highly impractical in view of the constant addition of wireless beacons and the manpower that would be required.

A preferred and far simpler method would be to collect data about each wireless beacon based on information about the strength of a signal provided by each wireless beacon at a plurality of locations at which a signal from that wireless beacon is being received. Basically, the geographic location of each wireless beacon is determined based on analysis of the signal strength provided by that wireless beacon as a function of geographic location.

To enable such an analysis, a scanner 18 is equipped or collocated with a GPS device 20 and during movement of the scanner 18, a series of readings consisting of the position of the scanner 18, obtained using the GPS device 20, and the strength of the signal received at this position are obtained from a wireless beacon (see FIG. 2). The scanner 18 may be a hand-held mobile device such as a PDA or cell phone including a processor having software 22 designed to analyze the signal received via an antenna 24 from every single beacon at different positions and estimate a geographic location thereof. A series of readings for each beacon will be stored in a database 26. Thus, if multiple beacons are being mapped, there will be multiple series of readings.

Referring to FIG. 3, these readings will look like a series of data sets designated (Xi, Yi, Si) where Xi and Yi are the latitude and longitude, respectively, of the position of the scanner 18 and Si is the strength of a signal received at this position from wireless beacon 28. With the scanner 18 at position P1, a reading of (X1,Y1,S1) is obtained, with the scanner 18 at position P2, a reading of (X2,Y2,S2) is obtained and with the scanner 18 at position P3, a reading of (X3,Y3,S3) is obtained.

Figure 4:
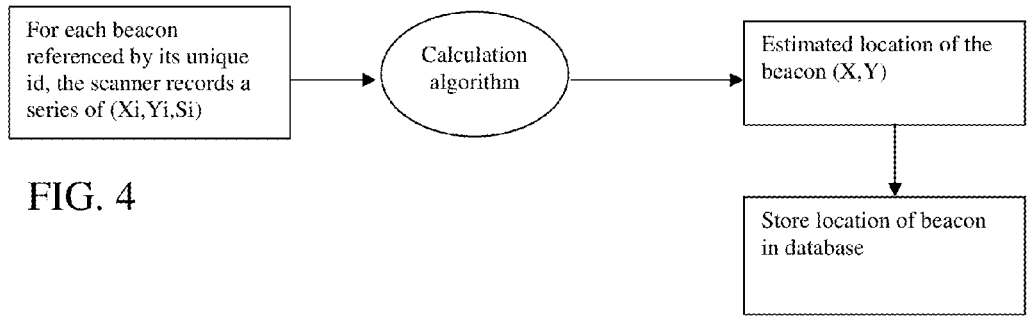
FIG. 4 is a flowchart showing the mapping of wireless beacons from the scanner readings.

Each series of readings, i.e., the readings obtained from each individual beacon 28, recorded by the scanner 18 may be stored in the scanner's memory. To obtain an estimated position of each beacon, the series of readings relating only to that beacon is input to a calculation algorithm 30 that processes the readings to provide as output, an estimated position of the beacon 28 (see FIG. 4). If multiple series of readings are input to the algorithm, then the position of all of the beacons 28 from which readings were obtained will be output.

Note that at each position of the scanner 18, multiple readings can be obtained, one for each beacon 28 in reception range of the scanner 18. These readings can be stored with an identification of the beacon 28 so that the readings can later be combined with other readings from the same beacon 28 in order to determine the location of the beacon 28.

Different calculation algorithms 30 can be used in the invention to process each series of readings into the position of the beacon 28. These include Centroid, triangulation, Newton and the like. An exemplifying calculation algorithm 30, namely the Centroid algorithm, is described below. Generally, regardless of which algorithm 30 is used, approximately the same estimated position of the beacon 28 will be obtained and thus, the invention is not limited to use of any particular algorithm.

It is important to bear in mind that scanner 18 can be and typically is the same as mobile device 10 (in which case, GPS device 20 is the same as GPS device 12, the software 22 and database 26 would be part of the wireless positioning system 14 and antenna 24 would be part of the mobile device 10). This embodiment will be considered hereinafter. In this case, mobile device 10 would not only create and/or update the database 26 of wireless beacons in the wireless positioning system 14 via operation of the scanning software 22 (when GPS signals from GPS device 12, 20 are available) but would also use the same database 26 of wireless beacons it is updating to determine its position in the absence of an accurate GPS signal from the GPS device 12, 20 (when GPS signals from GPS device 12, 20 are not available). Thus, when GPS signals are available and switch 16 is allowing the GPS signal from the GPS device 12, 20 to be directed to the mobile device 10, mobile device 10 is working as scanner 18 to scan the area around the mobile device 10 to determine the presence of (unmapped) wireless beacons and obtain geographic positional information about these unmapped wireless beacons for inclusion in the database 26 of wireless beacons resident in the wireless positioning system 14.

After the estimated position of the beacons is obtained, the final step in creating the database 26 of wireless beacons in wireless positioning system 14 is to store the positions of the beacons 28 in a database in a manner in which the position of the beacon is associated with an identification code. For example, the position of each beacon 28 can be stored in the database 26 in the form (Id, X, Y) where Id is a unique identification associated with or referencing the beacon 28 and X, Y are the latitude and longitude coordinates, respectively, of the beacon 28 as determined in the manner described above.

The database creation step continues whenever a GPS signal is available and the position of the scanner 18 has changed. Thus, when the scanner 18 is the same as mobile device 10, movement of the mobile device 10 in the presence of a GPS signal from GPS device 12, 20 can result in continuous updating of the database 26 of wireless beacons in wireless positioning system 14.

In the exemplifying use described above with respect to FIG. 1, the database 26 of wireless beacons in wireless positioning system 14 is used only when a GPS signal from GPS device 12, 20 is unavailable. At this time, it is necessary to input data into the database 26 to determine the position of the mobile device 10.

Figure 5:
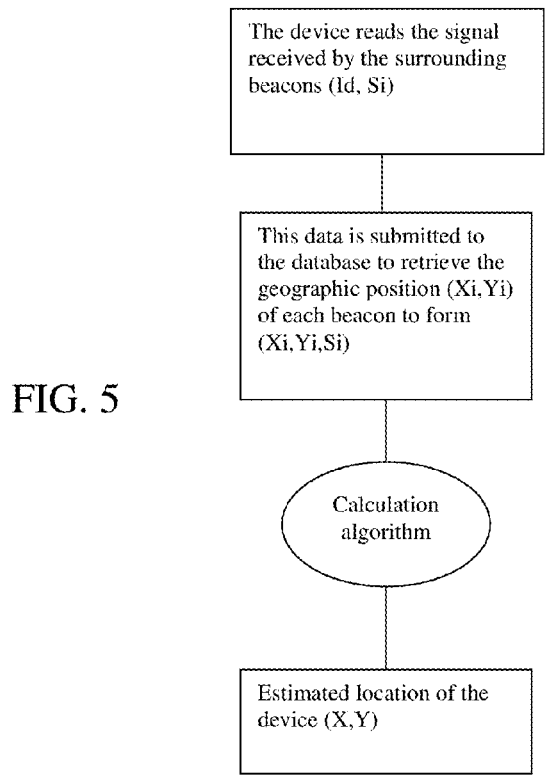
FIG. 5 is a flowchart showing the determination of the position of a mobile device based on instantaneously received signals from wireless beacons and the database thereof.

With reference to FIG. 5, determining the position of the mobile device 10 using the database 26 of wireless beacons in wireless positioning system 14 entails querying a receiver unit of the mobile device 10, i.e., a network adapter or cell antenna 24, to find out which wireless beacon(s) 28 are "visible" and what is the strength of the signal received by the receiver from each wireless beacon 28. Visible beacons 28 are those from which the receiver receives a signal.

From the antenna 24, the mobile device 10 will obtain a series of readings each containing the unique identification associated with or referencing one of visible wireless beacons 28 and the strength of the signal from that wireless beacon 28. This series of readings can be expressed in the form of (Id, Si) where Id is the unique identification of the wireless beacon 28 and Si is the signal strength.

The mobile device 10 then submits this information to database 26 in wireless positioning system 14 which contains the geographic location of the wireless beacons 28 in association with their identification. Using the data contained in the database 26, the corresponding, estimated geographic location of the wireless beacon 28 is obtained based on its identification contained in the information and is associated with the signal strength.

After the location of the visible beacon(s) 28 associated with the antenna 24 is known, a series of (Xi, Yi, Si) records is provided to the calculation algorithm 30 to estimate the position of the antenna 24, i.e., the position of the mobile device 10.

As described above, a calculation algorithm 30 is used to determine the position of a wireless beacon 28 when creating the database 26 of wireless beacons and also to determine the position of the mobile device 10 in the absence of a GPS signal from GPS device 12, 20.

When determining the position of a wireless beacon 28 in the mapping mode from the series of readings (Xi,Yi,Si) to determine the position (X,Y) of the wireless beacon 28, the Centroid calculating algorithm averages the latitudes and longitudes recorded and adds the signal strength squared as a weight:

$$X = (S1^2 * X1 + S2^2 * X2 + \ldots + Sn^2 * X2)/(S1^2 + S12^2 + \ldots + Sn^2)$$

$$Y = (S1^2 * Y1 + S2^2 * Y2 + \ldots + Sn^2 * Y2)/(S1^2 + S12^2 + \ldots + Sn^2)$$

where X and Y are the estimated position of the beacon 28 and the Si, Xi, Yi the information recorded by the scanner 18.

When estimating the position of the mobile device 10 using the same formula, Xi, Yi would be the coordinates of the wireless beacons 28 referenced in the database 26 and Si would be the strength of the signal received from those same wireless beacons 28.

Applying the database mapping technique described above using scanner 18, when incorporated into the mobile device 10 with a common GPS device 12, it becomes possible to create a collaborative database. That is, a database which is continually being updated with data about new wireless beacons can be formed. Scanner 18 obtains identification and signal strength data about new, unmapped wireless beacons when the GPS device 12 receives accurate positioning signals and determines the position of the unmapped wireless beacons for inclusion in the database of wireless beacons in the wireless positioning system 14 which is used when accurate GPS signals from GPS device are not available. The same positional information about previously unmapped wireless beacons being directed to the database in the wireless positioning system 14 can also be directed to a central monitoring or administration facility which is charged with the responsibility for providing an accurate database of wireless beacons. The positional information can be forwarded to this facility periodically, such as every 24 hours. In conjunction with an upload of positional information about new wireless beacons, positional information about new wireless beacons obtained from other mobile devices 10 can be downloaded from the facility.

The central facility thereby oversees collection of individual contributions to the database, one from each participating (collective) mobile device, and disseminates the collection of the individual contributions to all mobile devices using the same positioning technique. It must be understood that not all mobile devices 10 will be equipped with a scanner 18 in which case, only some mobile devices would contribute positional information to the central facility but all mobile devices would preferably receive the update of positional information. Since the uploading of the positional information from the mobile devices to the central facility and downloading of the positional information from the central facility to the mobile devices may be done without involvement of the user, the central and individual databases of wireless beacons can therefore be passively created, updated and disseminated.

Figure 6:
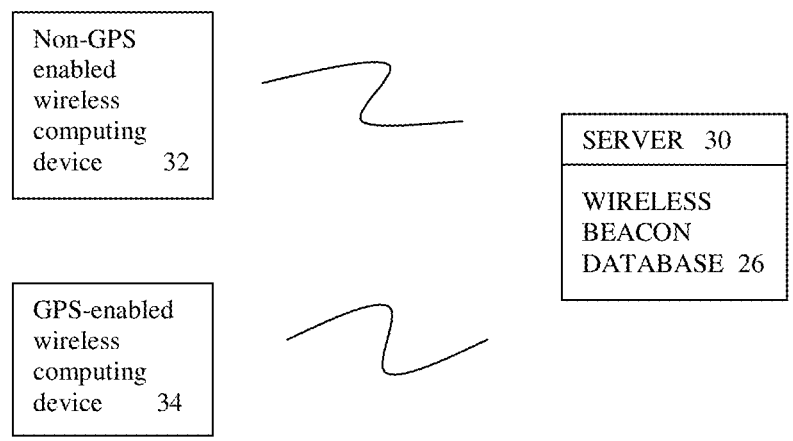
FIG. 6 is a schematic of an embodiment of the invention for enabling a mobile device to determine its position.

Database 26 of wireless beacons can be maintained by the central facility and in addition or alternatively, can be installed onto a deployable server, e.g., server 30 of FIG. 6. Such a deployable server 30 can be sold or leased to customers to enable them to continually determine the position of any movable device having an Internet connection under their authority or control, without requiring access to the central facility. The server 30 could be periodically provided with database updates. In this manner, a large company for example, could employ such a server 30 to track its personnel and vehicles having mobile devices. By separating the database construction and database use, such a company would not have to concern itself with the scanning feature to create and update the database as described above.

The deployable server 30 could also be operated in conjunction with scanners by the purchaser or lessor of the server 30. That is, a client could have control of both the mapping or scanning functions and the position locating system. A third party could provide management and storage of the database, control access to the database and position location information as per the customer's specification and otherwise relieve the customer of the responsibilities of managing the system.

Another application of the ability to determine the position of a mobile device 10 in accordance with the invention, and primarily laptop computers, is the ability to provide an Internet-based service that would almost immediately advise the user of a mobile device 32, 34 of their position (see FIG. 6). This service could be formed as a computer software program, downloadable upon request, and installed in the mobile device 32, 34. The user's position would be provided either continually, periodically or upon request. The latter implementation is a "query mode" of use of the invention In the query mode, an icon could be created to enable initiation of a positional display so that whenever the user wants to know his or her position, they could click on the icon and their position would be provided (in the manner as described above with reference to FIG. 5). Such an icon could be continually or periodically displayed on the screen and whenever clicked by the user, the user's position would be displayed. A background icon could also be formed. It is important to note that the user's position can be continuously determined and only displayed upon request by the user or the user's position could be both determined and displayed only upon request by the user.

Additionally or alternatively, the program can provide an option to the user to have a section of the screen display the user's position. Such a display may occupy a corner of the screen.

In this scheme, the user of the mobile device is able to obtain his or her position even though the mobile device is not equipped with a GPS or other satellite-based position determining system (mobile device 32). Rather, using only a Wi-Fi connection to the Internet, and specifically a link to a server or site 30 which maintains the database of beacons 26, the user is able to communicate with the site 30 and be provided with their position. Such a service may be a fee-based service wherein the users pay a monthly fee, pay per request for their position, free subject to position-based advertising exposure or any other manner known to those skilled in the art of providing an Internet-based service.

The foregoing description of embodiments of the invention for position determination of mobile devices relies on the knowledge of the exact identification details of wireless beacons, including their country identifier, region identifier and cell identification. Thus, when a user requests the position of their mobile device, the algorithm can use the beacon information and provide the user's position. However, in some countries or regions of countries, there may be an insufficient number of known beacons in the database, or possibly no beacons in the database, to provide the exact position of the user.

In this case, so long as the mobile device is able to connect wirelessly to the Internet using one or more beacons, the program can nevertheless provide a country identifier at a minimum from the data about known beacons in the database, and based on the ability of the mobile device to communication with the beacon(s). In addition, often it will be possible to provide the region identifier from the data about known beacons in the database when the mobile device is capable of communicating with one or more of the beacons. Although a determination of the user's country identifier and possibly region identifier is often not optimal, it is significantly better that the absence of a determination of any positional information.

The problem may arise when the identification of the beacon with which the mobile device is communicating is not known, i.e., is not in the database. The inability to provide accurate positional information will persist until the mobile device maps the beacon, if it is able, or the database is updated with information about the unidentified beacon.

Another feature of the system in accordance with the invention is the ability to track mobile devices. This feature involves creating a group of authorized users (of mobile devices) among which the position of all of the users in the group will be shared, either directly or through a server 30. So long as each user communicates with a wireless beacon, each user's position is determined by the system in the user's mobile device and provided through the wireless Internet connection (and possibly the server 30) to the other users in the group. Each user can determine when they want their position to be provided to the other users in the group. This embodiment is operative whenever the user's mobile device is GPS-enabled, e.g., mobile device 34, and for those users without GPS-enabled mobile devices, e.g., mobile device 32, it is still operative when they are present in a mapped area and capable of communicating with a server 30 containing the beacon database 26, to enable their position to be determined based on the signals from wireless beacons in the manner described above.

Creation of a group may also be applicable when forming a database of wireless beacons. A group can be created which shares database information among the members of the group prior to forwarding the database updates to the central server 30. In this case, only one member of the group needs to communicate with the central server 30 to provide the update information and receive update information in return. The received update information is them disseminated to the other members of the group. It becomes apparent that only one member of each group is required to communication with the central server 30.

Yet another feature of the system described above is the ability to present to the user information based on their position. For example, once the mobile device determines its position in the manner described above, the user can be provided with an entry field to input a desired type of establishment, e.g., coffee shop, hotel, restaurant, pharmacy, and the system will then look up using the Internet connection, one or more closest establishments based on the user's position.

Once the position of mobile devices is determined in accordance with the invention, and thus the position of the users' thereof, it becomes possible to use the positional data in various ways. One way is to tailor advertising to the users based on their position. Another way is to provide information about requested types of establishments as described above. Another way is to perform a statistical analysis of the position of users to specific websites. That is, the operator of a website may want information about the location of the people accessing that website and using mobile device. The invention can readily provide such information in that it determines the users' locations and can forward that information to the website operator whenever the user is linked to the website.

Yet another way is to use the user's location to limit or restrict transmission of data, i.e., if the user is present in a certain country, transmission of certain data to that country would not be possible. Also, the server's determination of the geographical location of the user's mobile device can be used to verify or confirm information about the user's location provided by the user. That is, if the user inputs information indicating they are situated in one place while the server determines they are situated in a different place, transmission of data to the user can be restricted in view of this discrepancy.

Figure 7:
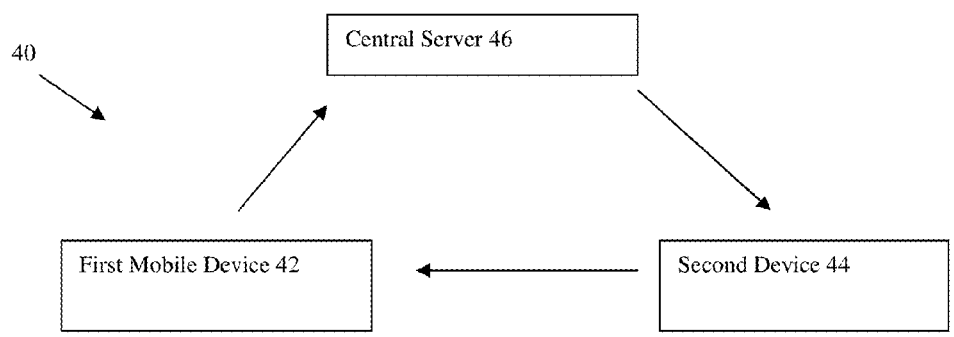
FIG. 7 is a schematic of a first embodiment of a message-based location responding system in accordance with the invention.
Figure 8:
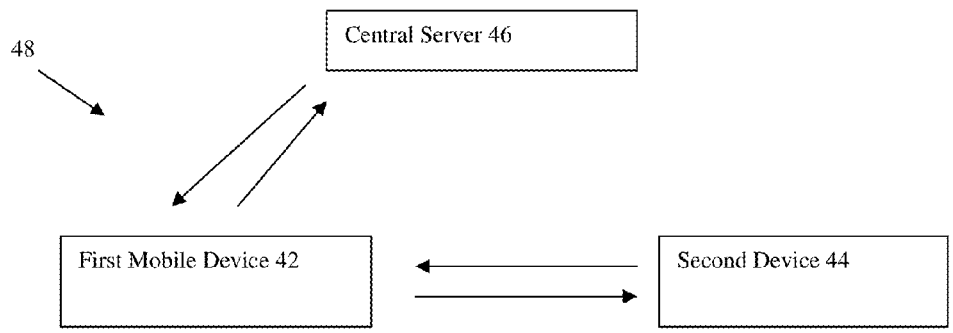
FIG. 8 is a schematic of a second embodiment of a message-based location responding system in accordance with the invention.

Referring now to FIGS. 7 and 8, any of the foregoing techniques for a mobile device to determine its location may be applied in a platform or system 40 which can provide the location of a first mobile device 42 to a second device 44 upon request by that second device 44, with or without the user of the first device 42 knowing that their position is being provided to the second device 44. That is, one person can obtain the location of another person, or at least the location of their mobile device which will be assumed to be the same as the location of that person, using communications involving the devices 42, 44 and a central server 46. Although the second device 44 may be a mobile device, it may be another electronic device, including a computer at a generally fixed location, which can connected with the central server 46 and transmit messages to the first mobile device 42.

System 40 relies on the use of the transmission of messages between electronic devices, such as SMS messages, the protocol for which is well-known in the art and the programming required for computer software in a mobile device or other wireless computing device to generate such messages is also well-known in the art. When the user of the second device 44 wants to obtain the location of the user of the first device 42, the user would operate the second device 44 to generate a query for the location of the first device 42. The computer program in the second device 44 would include a query application to allow for generation of the query. This query would be converted by the computer program in the second device 44 into an SMS message which is directed to the first device 42 (the transmission of this query being represented by an arrow from the second device 44 to the first device 42). A computer program in the first device 42 receives the SMS message, interprets it as a request for the location of the first device 42 and then initiates a determination of its location.

The query for the location of the first device 42 may also be generated using push e-mail, in which case, the computer program at the second device 40 would include a push e-mail generating application. The computer program at the second device 44 may also be arranged to receive data about the first device 42, e.g., an e-mail address or phone number, and generate the query in an appropriate form based thereon, e.g., push e-mail or SMS message.

After initiation of the location determining feature of the first device 42, the location of the first device 42 may be determined or otherwise obtained using any of the various techniques described above. In one technique, the first device 42, if equipped with a GPS-enabled location determining application, would determine its location using GPS. If the first device 42 is unable to obtain a satisfactory GPS-based location determination or does not have GPS capabilities, it may access its internal database of known wireless access beacons and their location, and determine its location from signals being received from these wireless beacons (see the detailed discussed above for an explanation of this technique).

Alternatively, the first device 42 may interact with the central server 46, transmitting a request to the central server 46 for its location (represented by the arrow from the first device 42 to the central server 46), with the central server 46 then determining the location of the first device 42. The computer program in the first device 42 may be arranged to transmit this request to the central server 46 via an SMS message or using an Internet protocol (http or TCP/IP). To enable the central server 46 to determine its location, the first device 42 would provide information about, for example, its reception of signals from wireless beacons to the central server 46 which would then determine the location of the first device 42 based on such information in combination with data from a database maintained by or other accessible to the central server 46 about the location of the wireless beacons (see the detailed discussion above for an explanation of this technique). These location determining techniques are examples of the manner in which the location of the first device 42 may be determined and are not meant to limit the invention in any way whatsoever. Indeed, the invention expressly contemplates the use of alternative techniques to determine the location of the first device 42, known to those skilled in the art, upon initiation of a request for such a determination by the first device 42.

Once the location of the first device 42 is determined, it is provided to the second device 44.

As shown in FIG. 7, the location of the first device 42 may be provided directly from the central server 46 to the second device 44 in any known manner (represented by the arrow from the central server 46 to the second device 44). One such manner is the use of an SMS message, in which case, the second device 44 could generate an SMS message to obtain the location of the first device 42 and receive a responsive SMS message providing the location of the first device 42.

In the alternative, as shown in FIG. 8, the location of the first device 42 is directed to the second device 44 by transmitting the determination of the location of the first device 42 from the central server 46 to the first device 42, for example using Internet protocol, and then transmitting the location of the first device 42 from the first device 42 to the second device 44, for example, using Internet protocol (each of these transmission is represented by an arrow). In this case, there is no direct communication of the location of the first device 42 from the central server 46 to the second device 44.

For certain purposes, it may not be desirable to notify the user of the first device 42 that their position is being provided to the second device 44. To this end, the computer program in the first device 42 may be programmed to initiate its location determination and interact with the central server 46 without causing a change in the operation of the first device 42 which is discernible by the user. That is, the computer program avoids indicating any operation of the location determining application and any indication of a received communication from the second device 44. Moreover, the central server 46 would not transmit the determined location of the first device 42 thereto, or if transmitted, the computer program at the first device 42 may be programmed to store the determined location and use it only upon subsequent need or request by the first device 42.

One way to avoid notifying the user of the first device 42 that their location is being determined and provided to the second device 44 is to monitor a queue of incoming SMS messages and e-mail messages and automatically detect a query from another device, such as the second device 44, for the location of the first device 42, which is in the form of a message. Specifically, the computer program at the first device 42 would analyze the queue of incoming messages before there are indicated as being received to the user of the first device 42, grab any query messages from the queue relating to a location determination, recognize the need to initiate the location determining function from the grabbed query messages, initiate the location determining function and remove the query messages from the queue to avoid their presentation to the user. The query messages could also be left in the queue if it is not desired to prevent the user of the first device 42 from seeing that others want to know their location.

To enable the computer program to detect query messages, a predetermined "action code", or term, may be used by the second device 44 to include or associate with the query with the computer program in the first device 42 being arranged to recognize the action code or term. The action codes or terms may be provided by the central server 46.

In order to enable the first and second devices 42, 44 to perform as described above, each must be provided with a computer program embodied on computer-readable media therein. The computer program may include a location determination/notification application (which performs the functions of the first device 42 as described above) or a query application (which performs the functions of the second device 44 as described above) or both. That is, a device may be provided with only the query component if the user thereof only wants to be able to obtain the location of other mobile device users without their location being obtainable, or with only a location determination component which would not allow the user to obtain the location of other mobile device users. These computer program components may be downloaded and installed individually or in combination.

The computer program in the first device 42 may be arranged to detect receipt of a location determination query from another device, possibly authenticate the request to avoid misuse of the system 40, and then initiate a determination of the location of the first device 42. The computer program may be designed to monitor a queue of incoming SMS messages and e-mails, detect a query message from another device for the location of the first device 42, grab any query messages, recognize the need to initiate the location determining function from the grabbed query messages and then initiate the location determining function and optionally remove the query messages from the queue. If a predetermined action code or term is used and associated with a message to indicate it is a query message, then the computer program would analyze the incoming messages for the presence of the action code or term. The action codes or terms could be stored in a memory of the first device 42 which is accessed by the computer program.

Initiation of the location determining function may entail generating and transmitting a request to the central server 46 for the location of the first device 42. Alternatively, the computer program determines the location of the first device 42 and would then control a transmission application to transmit it to the central server 46, for example, using SMS messages or Internet protocol. The computer program may optionally be arranged to avoid notifying a user of the first device 42 of the detection of the query from the second device 44 for the location of the first device 42, as well as the subsequent actions arising from the receipt of the query.

The computer program in the first device 42 also controls a transmission unit to transmit its determined location to the second device, for example, using Internet protocol, when the first device serves a conduit between the central server 46 and the second device 44 (see FIG. 8).

The computer program in the second device 44 may be arranged to enable a query for the location of another device having at least the location determination component of the same computer program, such as the first device 42, to be generated, e.g., via an SMS message application or a push e-mail application, and direct the query to the first device 42. The query may be directed via a communications network in the same manner as existing SMS messages or e-mail messages are transferred between wireless computing devices or mobile devices or other computers. If action codes are used, the computer program would be arranged to include or otherwise associate an action code or term with the messages to designate it as a query message, and thereby enable the computer program on the first device 42 to detect that the message is a query message requiring initiation of a location determining function of the first device 42.

The central server 46 also includes a computer program embodied on computer-readable media which coordinates the interaction between the devices 42, 44 using the location determining platform or system 40. It would therefore control a transmission unit of the central server the direct the determined location of the first device 42, whether provided by the first device 42 or determined at the central server 46 based on signals received from the first device 42, to the second device 44. It would also control the transmission unit to direct the responsive SMS message to the second device 44 (see FIG. 7) and the transmission to the first device 42 (see FIG. 8).

The embodiment wherein first device 42 is not notified and does not react to the query message from the second device 44 has excellent application in the field of recovering lost or stolen objects. If the first device 42 is lost or misplaced, the owner of the first device 42 can send a query message to the first device 42 from a second device 44 causing the first device 42 to return its location to the second device 44 thereby providing the owner with the location of the lost or misplaced first device 42.

For stolen objects, recovery of not only the first device 42 itself but also of objects associated with the first device 42 is greatly facilitated since the first device 42 can provide its location without the possessor thereof knowing that the location is being provided. Thus, if the first device 42 is stolen, the owner of the first device 42 can send a query message to the first device 42 from a second device 44 causing the first device 42 to return its location to the second device 44 thereby providing the owner with the location of the stolen first device 42. This location can be provided to law enforcement authorities who can proceed to the location to retrieve the stolen first device 42 and possibly apprehend the thief.

If the first device 42 is situated in a vehicle, or incorporated into the vehicle, and stolen, the owner of the first device 42 can again send a query message to the first device 42 from a second device 44 causing the first device 42 to return its location to the second device 44 thereby providing the owner with the location of the stolen vehicle. This location could be provided to law enforcement authorities who can proceed to the location to retrieve the stolen vehicle and possibly apprehend the thief.

A system is also envisioned whereby vehicles could be provided with mobile devices like the first device 42 and law enforcement authorities are provided with a second device 44, any computer equipped with the query generating software component whether situated at a police station or in a mobile police vehicle, and software is provided to enable the law enforcement authorities to determine the locations of any vehicles. In this case, a vehicle owner would report a stolen vehicle to the law enforcement authorities who would then use their second device 44 send a location determining query to the first device 42 on that vehicle and retrieve the location of the vehicle. In view of the relatively low cost for hardware and software components to implement the first device 42, this would provide a relatively inexpensive vehicle theft prevention system. Also, the first device 42 can be situated on the vehicle in a manner which prevents its removal and tampering therewith.

Figure 9:
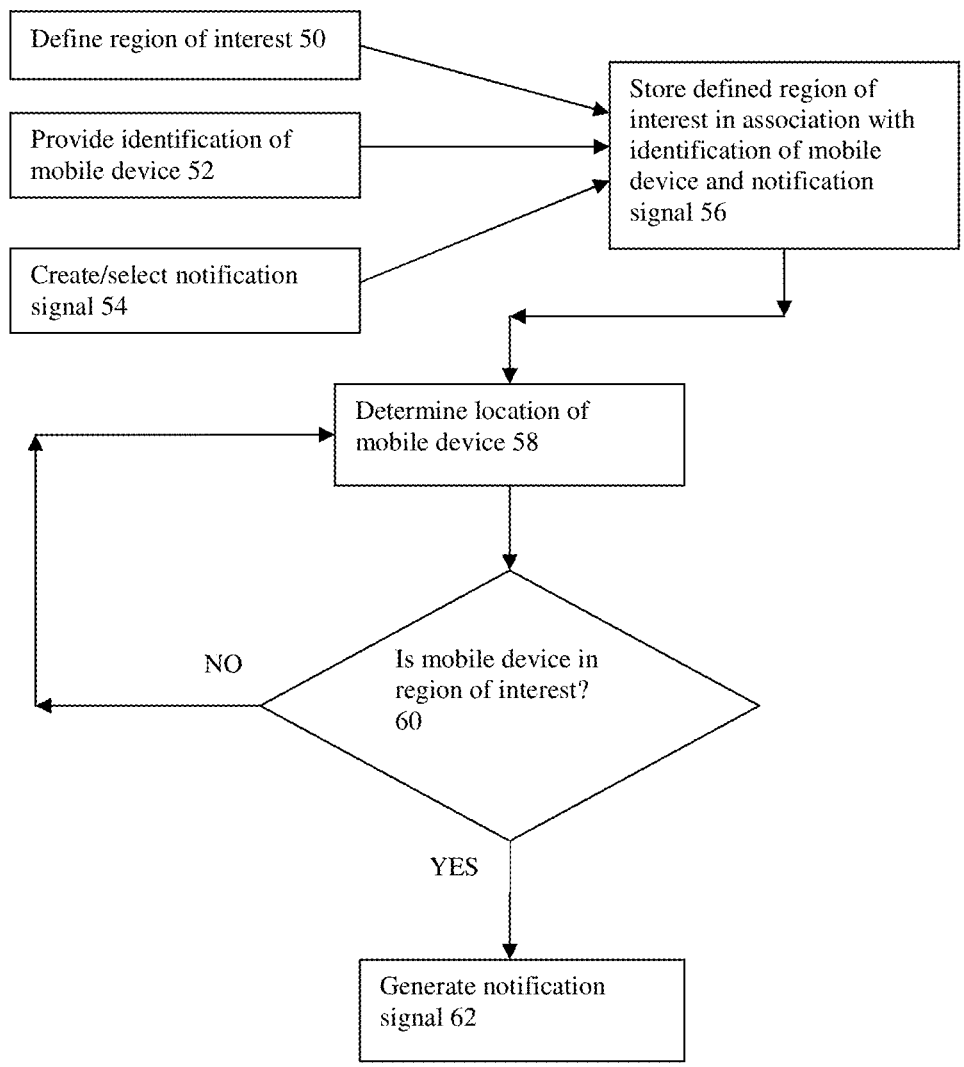
FIG. 9 is a schematic of a method which provides notification when monitoring the location of a mobile device relative to a region of interest, and specifically when the mobile device enters into the region of interest.

Referring now to FIG. 9, another method for monitoring a wireless computing device or mobile device in accordance with the invention will be described. In this method, the location of the mobile device is monitored relative to a specific area or region of interest which may be determined by the user of the mobile device or another person who wants to know where the user of the mobile device is located, assuming their mobile device is at the same location. This method does not require sending a query such as an SMS message to initiate a location determining function of the mobile device. Rather, in this embodiment, a technique is provided which allows a person to designate a region of interest and associate the region of interest with a mobile device so that when the mobile device leaves, is within or enters into this region of interest, notification is automatically provided about such departure, presence or entry.

This technique has tremendous application in the field of monitoring people. For example, it is possible for parents to monitor their child's departure from or arrival at their house, school, a friend's house, an extracurricular activity, or any other location by simply providing the location of their house, the school, the friend's house or the extracurricular activity so that when the child leaves or arrives at the provided location, the parent is notified of the child's departure or arrival. Another application is when a person wants to monitor their own location, i.e., self-monitoring. In this case, a person might be traveling on a train, such as a commuter, and wants to know when they arrive at a particular station. The person could provide the location of the station and they themselves would be notified when they arrive at the station.

FIG. 9 shows a method which would provide notification when a mobile device enters into a region of interest. The same steps would be present in a method for determining when a mobile device leaves a region of interest, with the notification being generated when the location of the mobile device changes from inside the region of interest to outside of the region of interest instead of when the location changes from outside of the region of interest to inside of the region of interest.

Accordingly, the method involves initial steps of defining a geographic region of interest, step 50. The region of interest is an area into which the person wants to know when they or another person possessing a mobile device enters. The region of interest may be entered using an interactive map database whereby the person is presented with an opportunity to provide an address or part thereof and a relevant map is displayed. The person can then use a user interface, such as a mouse or stylus, and demarcate the region of interest on the displayed map. Existing map databases may be used such as those provided by Mapquest and Google maps. Such features as zoom may be used to bring the map to the desired resolution for the person to define the region of interest.

Also, the actual application which enables the region of interest to be defined may be by pointing at corners of a rectangular box on the map to thereby define a rectangular region of interest or, or by clicking at a single point and having a circle form at a fixed radius from this point to thereby define a circular region of interest. The invention envisions numerous ways to demarcate a region of interest upon viewing a map. Moreover, it is possible to define a region of interest without viewing a map hereby an address is provided and is automatically converted into map coordinates.

Additional initial steps in the method are to identify the mobile device, the location of which relative to the defined region of interest is to be monitored-step 52, and create or select a notification signal to be generated based on the location of the identified mobile device-step 54. Then, the defined region of interest is stored in association with an identification of the mobile device in a memory component, and the request for the notification signal to be sent, step 56. The person defining the region of interest may be provided with the possibility of either freely selecting a notification signal or selecting one of a number of different available notification signals in the form of templates or messages (SMS messages or e-mail messages) to associate with the region of interest and the mobile device. The selection may be performed using a drop down list or a cutting and pasting maneuver whereby the person defines the region of interest, provides the mobile device identification and then attaches a template. One skilled in the art could readily design such a user interface in view of the disclosure herein, which user interface is also be considered part of the invention.

The next step 58 is for the location of the mobile device to be determined. The mobile device may be programmed to continuously determine its location, using any of the techniques described above, or continuously provide information to a server or other remote device to enable the server or other remote device to determine its location from the provided information (as described above).

Thereafter, a determination is made if and when the mobile device enters into the region of interest, step 60. If not, the mobile device would be programmed to periodically or continually determine its location, e.g., at minute intervals. The determination of whether the location of the mobile device has entered into the region of interest may be a determination that the location of the mobile device is changed to be within the region of interest, i.e., the current location of the mobile device is compared to the immediately preceding location to determine any change in the location and specifically, a change whereby the current location is within the region of interest.

If the mobile device is determined to have entered into the region of interest, the next step 62 is to automatically generate a predetermined notification signal relating to the entry of the mobile device into the region of interest, which means that the possessor of the mobile device does not have to undertake any manual intervention upon such entry.

If the person interested in knowing where the possessor of the mobile device is and is thus not the possessor of the mobile device, then the signal may be transmitted to a remote entity or device accessible by the monitoring person, e.g., a parent's mobile device that is notified that a child has arrived at school. The signal may be a predetermined SMS message or a predetermined e-mail message.

In this regard, in one embodiment of the invention, the person receiving the notification signal is able to customize the notification signal. For example, if the region of interest is a child's school and the parent wants to know when the child arrives at the school, the parent may be able to select, using a computer program managing the definition of the regions of interest and association of mobile devices therewith (described below), one of a plurality of pre-formed notification signals or templates which relate to arrival at school. In this case, an SMS message or e-mail might be "[Child's name] has arrived at school", with the parent providing the name of their child. The selection of a particular notification signal may be made when the person defines the region of interest. Thus, a person could define multiple regions of interest for one or more mobile devices, associate each with a particular notification signal and then receive a relevant message when the person or people possessing the mobile devices arrive at each of the regions of interest.

If the person wants to know themselves when they arrive at a particular location, then their mobile device may be programmed to react to the generation of the notification signal, e.g., emit a sound or vibrate. This would be particularly useful for commuters on trains and buses who might fall asleep. A commuter could program their mobile devices when they approach their stop, and the mobile device would emit sound and vibrate to alert them to the approaching stop and wake them up to prevent them from missing their stop.

When creating or selecting the notification signal, the monitoring person may also indicate the action of the mobile device relative to the defined region of interest for which information is sought, i.e., when the mobile device leaves the region of interest, when the mobile device enters into the region of interest or when the mobile device remains for a selectable period of time in the region of interest. If pre-existing templates are used, then selection of one of the templates may automatically result in an indication of the specific action of the mobile device relative to the defined region of interest. For example, selection of "[Child's name] has arrived at school" would automatically be considered a request to be notified when the location of the child's mobile device has entered into the defined region of interest.

As mentioned above, the method shown in FIG. 9 relates to monitoring the arrival of a person into a defined region of interest via monitoring of their mobile device although the same method is applicably for monitoring the departure of a mobile device from a region of interest. In this case, a notification signal may be "[Child's name] has left school". The same monitoring techniques may be used to provide a notification signal about the current location of the mobile device, e.g., "[Child's name] is at [current location]". The coordinates of the location could be converted into an address.

Another application of the method described above is for a person to define a region of interest their own device, whether a movable, mobile or fixed computing device, and monitor the location of another mobile device relative to their own location. In other words, a person can define a region of interest around their own device and enter information about other people's mobile devices and location-based notification signals to be generated based on analysis of the location of their computing device to the location of the other people's mobile device. This analysis may be that one of the other people has entered into the region of interest around the monitoring person's device or has left the region of interest around the monitoring person's device.

For example, if a parent wants to be notified when their child's mobile device (presumably carried by the child) leaves a region of interest around their own device, the parent could define a region of interest as a circle with a diameter or radius of 100 feet, provide the identification of their child's mobile device and a notification signal to be sent if the child's mobile device leaves the region of interest. If the child's mobile device leaves the region of interest, as determined by analysis of the location of the child's mobile device relative to the region of interest in the manner described above, a notification signal would be generated and provided to the parent's computing device. This notification signal may be a signal causing the parent's computing device to vibrate or emit sound. Since the parent's computing device may be a movable device, the parent could be notified whenever a child wanders more than a predetermined distance from the parent.

As for another example, a person may want to know when their friends are in close proximity to their location. The person would enter a defined region of interest relative to their computing device, e.g., a fixed distance such as 1 mile around their device, and provide the identification of other people's mobile devices and notification signals to be sent when any of the other people's mobile devices is within 1 mile of their own computing device. As above, the computing device may be a fixed, movable or mobile device, in which case, the region of interest would be variable.

When the monitoring person is using a mobile device, or another other movable computing device, this method would require two location determinations. First, the location of a device of a "first" person who wants to know when any of their friends are within a predetermined distance is determined, and the location of a mobile device of a "second" person is determined. The identification of this mobile device is provided by the first person along with the region of interest and a notification signal to be sent when both the second people is within the region of interest defined relative to the mobile device of the first person. The location of the mobile device of the second person may be determined in any of the ways discussed above, e.g., with respect to FIGS. 7 and 8 wherein the second person may or may not know that their location is being provided. The notification signal may be of the form "[Friend's name] is within 1 mile of your current location".

If the first person is walking through their neighborhood or school campus and programmed their mobile device to provide notification signals, they would receive notification signals whenever one of their friends is in close proximity to them (based on analysis of the location of their own mobile device to the location of their friend's mobile devices). Using mapping functions, the location of the mobile device of the second person could also be provided to the mobile device of the first person.

This method is also applicable when the second person has a computing device at a fixed location, which may be determined using any of the techniques described above and provided to the mobile device of the first person.

In another embodiment of the invention, the absolute location of the mobile device being sought is not required to be determined. Rather, when the monitoring person defines a region of interest relative to their own computing device, the relative position of another mobile device relative to their own computing device is analyzed and a notification signal may be generated based on the analysis. For example, if a parent wants to be notified when their child's mobile device (presumably carried by the child) leaves a region of interest around their own computing device, the parent could define a region of interest as a circle with a diameter or radius of 100 feet around their computing device, provide the identification of their child's mobile device and a notification signal to be sent if the child's mobile device leaves the region of interest. If the child's mobile device leaves the region of interest, as determined by analysis of the location of the child's mobile device relative to the parent's computing device, a notification signal would be generated and provided to the parent's computing device. This notification signal may be a signal causing the parent's computing device to vibrate or emit sound. Since the parent's computing device may be a movable or mobile device, the parent could be notified whenever a child wanders more than a predetermined distance from the parent.

The location of the child's mobile device relative to the parent's computing device may be determined without actually determining either the absolute location of the child's mobile device or the absolute location of the parent's mobile device. Rather, it is possible to analyze the strength of a signal transmitted from one device to the other, whether from the parent's device to the child's device or vice versa, and then generate a notification signal when the strength of the signal is below a threshold. The threshold may be set based on the parameters of the region of interest. Regardless of the threshold, if no signal is received, the notification signal would be generated. In this case, since the strength of a signal being transmitted from a mobile device to another device is used to analyze the location of the mobile device relative to the other device, the other device must be one capable of engaging in wireless communications, or at the least, capable of wirelessly receiving and/or transmitting signals.

To implement any of the foregoing methods, one or more computer programs are required.

Figure 10:
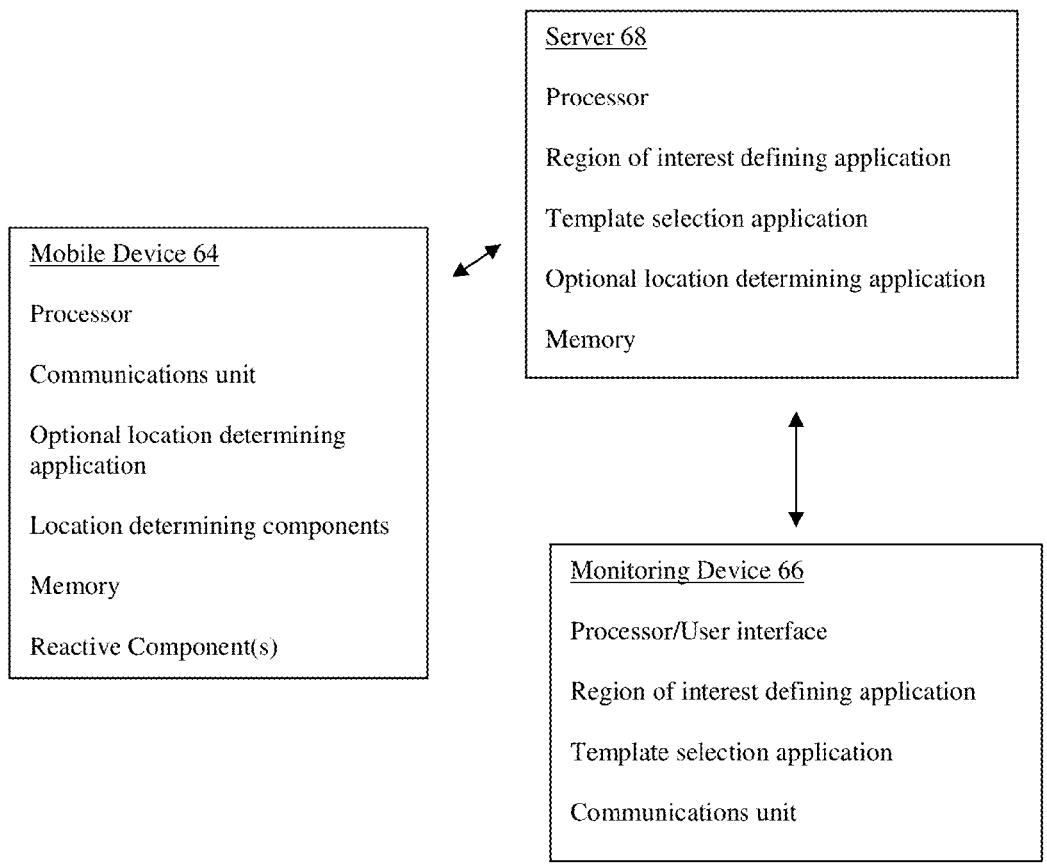
FIG. 10 is a schematic showing main components of a monitoring system in accordance with the invention which can implement the steps shown in FIG. 9.

Referring to FIG. 10, one embodiment of a computer program is embodied on computer-readable medium at the mobile device 64 whose location is being monitored and includes a location determining application or system which periodically determines its location using any of the techniques described above and to this end, may interact with location-determining components on the mobile device, e.g., a GPS-based system. The location determining application may therefore determine the location of the mobile device 64 at a predetermined frequency, which frequency could be based on movement of the mobile device 64.

The computer program also interacts with a memory component, on the mobile device 64 or elsewhere, which stores a defined geographic region of interest.

The computer program continually analyzes the location of the mobile device 64, as determined by the location determining application, relative to the region of interest stored in the memory component in order to determine when the mobile device 64 enters into the region of interest, leaves the region of interest or remains in the region of interest for a period of time (which would be selected when the notification request is formulated). The computer program may be arranged to analyze the location of the mobile device 64 relative to the region of interest only when the location of the mobile device 64 has been determined to have changed.

The computer program is also arranged to automatically generate a predetermined notification signal when it determines that the notification request has been satisfied, i.e., when the mobile device 64 has entered into the region of interest, has left the region of interest or has remained in the region of interest for a period of time, without manual intervention by a user of the mobile device 64.

If the notification is being provided to another person's device 66, the computer program is arranged to send the notification signal via a transmission or communications unit of the mobile device 64 to the device which has requested notification when the mobile device 64 enters into, leaves and remains in the region of interest. This device 66 receiving the notification signal, may be a desktop computer or mobile device, or any other type of computing device capable of assigning a designated region of interest with an associated mobile device, or one which has been designated to receive the notification signal by another device. The computer program could direct the transmission or communications unit to formulate an SMS message or an e-mail message embodying the notification signal.

If the device 66 is a mobile device, then the defined region of interest may be movable or variable in that it may be dependent on the position of device 66. In this case, whenever the location of the mobile device 64 is determined, the location of device 66 is also determined to ascertain whether mobile device 64 is has entered into, left or remained within the region of interest defined relative to the current location of device 66.

If the notification is being provided to the possessor of the mobile device 64, then the computer program may be arranged to generate the notification signal as a signal which causes a reactive component of the mobile device 64 to respond, for example, in the form of a vibration or emission of sound, which are typically built-in properties of components of the mobile device 64. The computer program may thus be arranged to respond to the notification signal by controlling any reactive system on the mobile device which is capable of conveying the fact of entry of the mobile device into the region of interest to the possessor thereof. As mentioned above, the memory component which stores the defined region of interest, entry by the mobile device 64 into which causes the generation of the notification signal, may be situated apart from the mobile device 64. It may be situated on a computing device 66 of a person seeking to know when the mobile devices 64 enters into the region of interest, e.g., on the computing device used to designate the region of interest, or at a server 68 separate from both the mobile device 64 and computing device 66 of the person seeking to know when the mobile device 64 enters into the region of interest. A dedicated server 68 for managing the monitoring of mobile devices in accordance with the invention is envisioned and details thereof are set forth below.

The computer program resident on the mobile device 64 may include a region of interest defining application arranged to enable a person to view at least one map, designate or define at least one region of interest on each viewed map to be stored in a memory component, associate the defined region of interest with a particular mobile device and associate a notification signal with the defined region of interest and the particular mobile device. Association of the mobile device 64 to the defined region of interest may involve providing a telephone number or e-mail address, or other identification property of the mobile device. Further, the computer program may include a template defining application arranged to enable the person to create a template or assign an existing template as a base for the notification signal to be automatically generated for each defined region of interest and associated mobile device.

The region of interest defining application and the template defining application may be arranged on any computing device 66 which seeks to interact with the mobile device monitoring system in accordance with the invention. Thus, a desktop computer could be provided with a computer program including the region of interest defining application and template defining application and be able to run these applications and associate regions of interest with mobile devices and be notified via a template-form message when the mobile devices enter into the defined regions of interest.

Alternatively, the region of interest defining application and the template defining application may be resident on a server 68 accessible via the Internet so that anyone with access to the Internet, and authorized by a manager or administrator of the monitoring system, could interact with these applications and define regions of interest and templates and be notified via a template-form message when the mobile devices enter into the defined regions of interest.

In one embodiment, the computer program on the mobile device 64 does not generate the notification signal. Rather, it provides its location, or signals which enable its location to be determined, to a server 68 remote from the mobile device. This server 68 includes a computer program which retrieves the region of interest for the mobile device from a memory component, whether located on a device of the person seeking to know when the mobile device 64 enters into a region of interest, located on the mobile device 64, located at the server 68 or another site remote from any of the devices, and analyzes the location of the mobile device 64 relative to the region of interest, determining the location of the mobile device 64 if necessary.

More specifically, the computer program at the server 68 is capable of storing a geographic region of interest defined by a person accessing the server 68 or which is defined remote from the server 68 and then provided to the server 68, periodically determining a location of the mobile device 64, continually analyzing the location of the mobile device 64 relative to the region of interest in order to determine when the mobile device 64 leaves, is in or enters into the region of interest (depending on the information being sought by the person monitoring the mobile device 64), and automatically generating a predetermined notification signal when it determines that the mobile device 64 has left, is present in or has entered into the region of interest. This last step is performed without manual intervention by a user of the mobile device 64, and may even be without knowledge of the user of the mobile device 64. The server application may further cause the signal to be transmitted a remote entity other than the mobile device 64 if the location of the mobile device 64 or its user is being monitored by another party, e.g., a parent monitoring the mobile device of their child.

The server application may determine the location of the mobile device 64 at a predetermined frequency and analyze the location of the mobile device 64 relative to the region of interest only when the location of the mobile device 64 has changed. The server application may also cause the notification signal to be transmitted to the mobile device 64 itself such that a reactive system on the mobile device 64 can react to the generation of the signal and generate a sound or vibrate (for particular use by commuters as described above). The server application could also present a plurality of templates for use as a base for the signal to be automatically generated.

The templates may relate to the region of interest, the location of the mobile device or a change in location of the mobile device.

The foregoing method and applications can be used to provide a notification whenever a mobile device, and presumably the user thereof, leaves a particular, predefined region or enters into a predefined region. No involvement by the user of the mobile device is required, and indeed, they could be prevented from even knowing that their location relative to predefined regions of interest is being monitored.

To implement the foregoing method and applications, a computer program could be downloaded by the mobile device and used to access a server in order to create an account and provide means to receive the notification signals, e.g., an e-mail address to receive e-mail messages relating to the monitoring of a particular mobile device. A mobile device would be required to have such software in order to provide its location or information to enable its location to be determined, and generally enable it to be monitored.

A common aspect of some of the methods and systems described above is the determination of the location of a mobile device based on signal reception from wireless beacons having known locations. An error which often occurs with such a determination arises from the fact that one or more of the wireless beacons being used in the location determining application may have been moved between the time at which their location is provided to the location determining application and the time at which the location determining application is being used to determine the current location of a mobile device. Certain types of wireless beacons are movable and if a previous location of such a movable wireless beacon is used to determine the location of a mobile device, the determination of the location of this mobile device will be erroneous.

One aspect of the invention is therefore to analyze the distance between a mobile device and the known location of wireless beacons, from which it is receiving signals which are to be used to determine the location of the mobile device, and eliminate those wireless beacons whose location differs significantly from the "known" location (based on signal reception by the mobile device). Specifically, information about reception of signals from wireless beacons by a mobile device, usually at least three to enable triangulation to be used, is used to determine the distance between the mobile device and each wireless beacon. An average of these distances is calculated and then the distance between each wireless beacon and the average distance is analyzed relative to a standard deviation to eliminate those wireless beacons which indicate that their "known" location may be clearly erroneous, i.e., they have been moved and are now at a location different than the stored location.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method, comprising:
    maintaining on a database server, a collaborative database containing geographic location information pertaining to Wi-Fi access points received from a plurality of Wi-Fi- and GPS-enabled mobile devices operated by a plurality of different users, the collaborative database including database records for each of a plurality of Wi-Fi access points including a MAC address and geographic location of the Wi-Fi access point, wherein at least a first portion of the database records are based on Wi-Fi identification and geographic location data received from a first Wi-Fi- and GPS-enabled mobile device of the plurality of Wi-Fi- and GPS-enabled mobile devices operated by a first user of the plurality of different users and at least a second portion of the database records different than the first portion are based on Wi-Fi identification and geographic location data received from a second Wi-Fi- and GPS-enabled mobile device of the plurality of Wi-Fi- and GPS-enabled mobile devices operated by a second user of the plurality of different users such that the collaborative database is built in a collaborative manner by at least the first and second Wi-Fi- and GPS-enabled devices operated by the first and second users, each of the first and second Wi-Fi- and GPS-enabled mobile devices comprising a Wi-Fi scanner and a GPS device, the first and second Wi-Fi- and GPS-enabled mobile devices each comprising a personal digital assistant (PDA) or a cell phone;

receiving, at a server, a location request from the first Wi-Fi- and GPS-enabled mobile device, the location request including a respective MAC address of at least one Wi-Fi access point for which a wireless signal is detected by the first Wi-Fi- and GPS-enabled mobile device;

retrieving, via a query issued to the database server using at least one MAC address included in the location request, geographic location data for at least one of the Wi-Fi access points from the collaborative database;

determining, via a processor, a geographic location of the first Wi-Fi- and GPS-enabled mobile device based at least on the geographic location data retrieved from the collaborative database; and returning, via the server, the determined geographic location to the first Wi-Fi- and GPS-enabled mobile device.

2. The method of claim 1, wherein the determined geographic location includes a latitude and longitude value.

3. The method of claim 1, wherein the first and second Wi-Fi- and GPS-enabled mobile devices each are a cell phone.

4. The method of claim 1, further comprising providing software configured to be executed on the first Wi-Fi- and GPS-enabled mobile device, wherein the software, upon execution enables the first Wi-Fi- and GPS-enabled mobile device to:

identify a MAC address for at least one Wi-Fi access point transmitting a wireless signal that is received by the first Wi-Fi- and GPS-enabled mobile device;

generate a location request including a respective MAC address for each of the at least one Wi-Fi access point transmitting a wireless signal for which a MAC address is identified; and send the location request to the server which is configured to facilitate access to the collaborative database.

5. The method of claim 4, wherein the software is further configured, upon execution, to enable a user of the first Wi-Fi- and GPS-enabled mobile device to cause the first Wi-Fi- and GPS-enabled mobile device to generate and send a location request to the server in response to selection of an icon by the user.

6. A method, comprising:

maintaining on a server system, a collaborative database containing geographic location information pertaining to Wi-Fi access points received from a plurality of Wi-Fi- and GPS-enabled mobile devices operated by a plurality of different users, the collaborative database including database records for each of a plurality of Wi-Fi access points including a MAC address and geographic location of the Wi-Fi access point, wherein at least a first portion of the database records are based on Wi-Fi identification and geographic location data received from a first Wi-Fi- and GPS-enabled mobile device of the plurality of Wi-Fi- and GPS-enabled mobile devices operated by a first user of the plurality of different users and at least a second portion of the database records different than the first portion are based on Wi-Fi identification and geographic location data received from a second Wi-Fi- and GPS-enabled mobile device of the plurality of Wi-Fi- and GPS-enabled mobile devices operated by a second user of the plurality of different users such that the collaborative database is built in a collaborative manner by at least the first and second Wi-Fi- and GPS-enabled mobile devices operated by the first and second users, each of the first and second Wi-Fi- and GPS-enabled mobile devices comprising a Wi-Fi scanner and a GPS device, the first and second Wi-Fi- and GPS-enabled mobile devices each comprising a personal digital assistant (PDA) or a cell phone;

receiving, at the server system, a location request from the first Wi-Fi- and GPS-enabled mobile device, the location request including a respective MAC address of at least one Wi-Fi access point for which a wireless signal is detected by the first Wi-Fi- and GPS-enabled mobile device;

retrieving, via a query issued to the server system using at least one MAC address included in the location request, geographic location data for at least one of the Wi-Fi access points from the collaborative database;

determining, via a processor, a geographic location of the first Wi-Fi- and GPS enabled mobile device based at least on the geographic location data retrieved from the collaborative database; and returning, via the server system, the determined geographic location to the first Wi-Fi- and GPS-enabled mobile device.

7. The method of claim 6, wherein the determined geographic location includes a latitude and longitude value.

8. The method of claim 6, wherein the first and second Wi-Fi- and GPS-enabled mobile devices each are a cell phone.

9. The method of claim 6, further comprising providing software configured to be executed on the first Wi-Fi- and GPS- enabled mobile device, wherein the software, upon execution enables the first Wi-Fi- and GPS-enabled mobile device to:

identify a MAC address for at least one Wi-Fi access point transmitting a wireless signal that is received by the first Wi-Fi- and GPS-enabled mobile device;

generate a location request including a respective MAC address for each of the at least one Wi-Fi access point transmitting a wireless signal for which a MAC address is identified; and send the location request to the server system which is configured to facilitate access to the collaborative database.

10. The method of claim 9, wherein the software is further configured, upon execution, to enable a user of the first Wi-Fi- and GPS-enabled mobile device to cause the first Wi-Fi- and GPS-enabled mobile device to generate and send a location request to the server system in response to selection of an icon by the user.

11. A method, comprising:
receiving at a database server, first Wi-Fi access point location data from a first Wi-Fi- and GPS-enabled mobile device operated by a first user, the first Wi-Fi- and GPS-enabled mobile device comprising a Wi-Fi scanner and a GPS device, the first Wi-Fi- and GPS-enabled mobile device comprising a personal digital assistant (PDA) or a cell phone, the first Wi-Fi access point location data including,
   GPS location data generated by the GPS device of the first Wi-Fi- and GPS-enabled mobile device, and
   a MAC address of a first Wi-Fi access point for which a wireless signal is detected by the Wi-Fi scanner of the first Wi-Fi- and GPS-enabled mobile device;
processing, via a processor, the first Wi-Fi access point location data to generate geographic location data for the first Wi-Fi access point;
adding the geographic location data and MAC address of the first Wi-Fi access point to a collaborative database containing Wi-Fi access point location data built in a collaborative manner from geographic location data from multiple mobile devices operated by users;
receiving, at a server, a location request from a second mobile device operated by a second user, the location request including a MAC address of the first Wi-Fi access point for which a wireless signal is detected by the second mobile device;
retrieving via a query issued to the database server, geographic location data for the first Wi-Fi access point from the collaborative database;
determining, via a processor, a geographic location of the second mobile device based at least on the geographic location data for the first Wi-Fi access point; and
returning, via the server, geographic location data to the second mobile.

12. The method of claim 11, wherein the geographic location data includes a latitude and longitude value.

13. The method of claim 11, wherein the first Wi-Fi- and GPS-enabled mobile device is a cell phone and the second mobile device is a cell phone.

14. The method of claim 11, further comprising providing software configured to be executed on the first Wi-Fi- and GPS-enabled mobile device, wherein the software, upon execution enables the first Wi-Fi- and GPS-enabled mobile device to:
   identify a MAC address for at least one Wi-Fi access point transmitting a wireless signal that is received by the first Wi-Fi- and GPS-enabled mobile device;
   determine a geographic location of the first Wi-Fi- and GPS-enabled mobile device through use of the GPS device of the first Wi-Fi- and GPS-enabled mobile device;
   generate the first Wi-Fi access point location data; and
   send the first Wi-Fi access point location data to the server.

15. The method of claim 11, wherein the step of adding the geographic location data and MAC address of the first Wi-Fi access point to the collaborative database containing Wi-Fi access point location data is performed only when the geographic location data and MAC address of the first Wi-Fi access point is not already present in the collaborative database.

16. A method, comprising:
receiving, at a database server from a first Wi-Fi- and GPS-enabled mobile device operated by a first user, a first set of Wi-Fi access point location data, the first Wi-Fi- and GPS-enabled mobile device comprising a Wi-Fi scanner and a GPS device, the first Wi-Fi- and GPS-enabled mobile device comprising a personal digital assistant (PDA) or a cell phone, the first set of Wi-Fi access point location data including,
   for each of at least one Wi-Fi access point from which a wireless signal transmitted from a Wi-Fi access point is detected by the first Wi-Fi- and GPS enabled mobile device,
      a MAC address of the Wi-Fi access point as detected by the Wi-Fi scanner of the first Wi-Fi- and GPS-enabled mobile device, and
      GPS location data generated by the GPS device of the first Wi-Fi- and GPS-enabled mobile device;
receiving, at the database server from a second Wi-Fi- and GPS-enabled mobile device operated by a second user, a second set of Wi-Fi access point location data, the second Wi-Fi- and GPS-enabled mobile device comprising a Wi-Fi scanner and a GPS device, the second Wi-Fi- and GPS-enabled mobile device comprising a PDA or a cell phone, the second set of Wi-Fi access point location data including,
   for each of at least one Wi-Fi access point from which a wireless signal transmitted from a Wi-Fi access point is detected by the second Wi-Fi- and GPS-enabled mobile device,
      a MAC address of the Wi-Fi access point as detected by the Wi-Fi scanner of the second Wi-Fi- and GPS-enabled mobile device, and
      GPS location data generated by the GPS device of the second Wi-Fi- and GPS- enabled mobile device;
processing, via a processor, data in the set first and second sets of Wi-Fi access point location data to generate geographic location data for at least one Wi-Fi access point having a MAC address included in the first and second sets of Wi-Fi access point location data; and
adding the geographic location data and MAC address of the at least one Wi-Fi access point to a collaborative database containing Wi-Fi access point location data,
whereby the collaborative database is thus built in a collaborative manner by the first and second Wi-Fi- and GPS-enabled mobile devices operated by the first and second users.

17. The method of claim 16, further comprising:
receiving, via a server, a location request from the first Wi-Fi- and GPS-enabled mobile device, the location request including a MAC address corresponding to at least one Wi-Fi access point for which a wireless signal is detected by the first Wi-Fi- and GPS-enabled mobile device;
in response to receiving the location request, retrieving geographic location data from the collaborative database for at least one Wi-Fi access point for which a MAC address is provided in the location request;
determining, via a processor, a geographic location of the first Wi-Fi- and GPS-enabled mobile device based at least on the geographic location data for the at least one Wi-Fi access point; and
returning, via the server, the determined geographic location to the first Wi-Fi- and GPS-enabled mobile device.

18. The method of claim 16, further comprising:
receiving, at the database server from a Wi-Fi- and GPS-enabled mobile device, a set of Wi-Fi access point location data including,
   a MAC address for a Wi-Fi access point transmitting a wireless signal received by the Wi-Fi- and GPS-enabled mobile device; and
   for each of a plurality of geographic locations, GPS-measured coordinates, generated by the Wi-Fi- and GPS-enabled mobile device, and at least one signal strength measurement of the wireless signal transmitted from the Wi-Fi access point measured by the Wi-Fi- and GPS-enabled mobile device;

processing, via the processor, data in the set of Wi-Fi access point location data to generate geographic location data for the Wi-Fi access point; and adding the geographic location data for the Wi-Fi access point and MAC address of the Wi-Fi access point to the collaborative database.

19. The method of claim 16, further comprising:

receiving, at the database server from a Wi-Fi- and GPS-enabled mobile device, a set of Wi-Fi access point location data including, a respective MAC address for each of a plurality of Wi-Fi access points transmitting a wireless signal received by the Wi-Fi- and GPS-enabled mobile device; and for each of a plurality of geographic locations, GPS-measured coordinates, generated by the Wi-Fi- and GPS-enabled mobile device, and at least one signal strength measurement of a wireless signal transmitted from at least one of the plurality of Wi-Fi access points measured by the Wi-Fi- and GPS-enabled mobile device;

processing, via the processor, data in the set of Wi-Fi access point location data to generate geographic location data for at least one of the plurality of Wi-Fi access points; and adding the geographic location data and MAC address for the at least one of the plurality of Wi-Fi access points for which geographic location data is generated to the collaborative database.

20. The method of claim 16, wherein the step of adding the geographic location data and MAC address of the at least one Wi-Fi access point to the collaborative database containing Wi-Fi access point location data is performed only when the geographic location data and MAC address of the at least one Wi-Fi access point is not already present in the collaborative database.

21. The method of claim 1, wherein in each of the first and second Wi-Fi- and GPS-enabled mobile devices, the scanner is equipped with the GPS device such that position data provided by the GPS device is considered position data for the scanner.

22. The method of claim 1, wherein in each of the first and second Wi-Fi- and GPS-enabled mobile devices, the scanner is collocated with the GPS device such that position data provided by the GPS device is considered position data for the scanner.

23. The method of claim 6, wherein in each of the first and second Wi-Fi- and GPS-enabled mobile devices, the Wi-Fi scanner is equipped with the GPS device such that position data provided by the GPS device is considered position data for the Wi-Fi scanner.

24. The method of claim 6, wherein in each of the first and second Wi-Fi- and GPS-enabled mobile devices, the Wi-Fi scanner is collocated with the GPS device such that position data provided by the GPS device is considered position data for the Wi-Fi scanner.

25. The method of claim 11, wherein in the first Wi-Fi- and GPS-enabled mobile device, the Wi-Fi scanner is equipped with the GPS device such that position data provided by the GPS device is considered position data for the Wi-Fi scanner.

26. The method of claim 11, wherein in the first Wi-Fi- and GPS-enabled mobile device, the Wi-Fi scanner is collocated with the GPS device such that position data provided by the GPS device is considered position data for the Wi-Fi scanner.

27. The method of claim 11, wherein the second mobile device constitutes a second Wi-Fi- and GPS-enabled mobile device, the second Wi-Fi- and GPS-enabled mobile device comprising a Wi-Fi scanner and a GPS device, the second Wi-Fi- and GPS-enabled mobile device comprising a PDA or a cell phone.

28. The method of claim 11, further comprising:

enabling a plurality of Wi-Fi- and GPS-enabled mobile devices operated by a plurality of different users to contribute to the collaborative database, the plurality of Wi-Fi- and GPS-enabled mobile devices including the first Wi-Fi- and GPS-enabled mobile device;

receiving at the database server, second Wi-Fi access point location data from a second Wi-Fi- and GPS-enabled mobile device of the plurality of Wi-Fi- and GPS-enabled mobile devices that is operated by a third user, the second Wi-Fi- and GPS-enabled mobile device comprising a Wi-Fi scanner and a GPS device, the second Wi-Fi- and GPS-enabled mobile device comprising a PDA or a cell phone, the second Wi-Fi access point location data including, GPS location data generated by the GPS device of the second Wi-Fi- and GPS-enabled mobile device, and a MAC address of a second Wi-Fi access point for which a wireless signal is detected by the Wi-Fi scanner of the second Wi-Fi- and GPS-enabled mobile device;

processing, via a processor, the second Wi-Fi access point location data to generate geographic location data for the second Wi-Fi access point; and adding the geographic location data and MAC address of the second Wi-Fi access point to the collaborative database containing Wi-Fi access point location data such that the collaborative database is built in a collaborative manner by at least the first and second Wi-Fi- and GPS-enabled mobile devices of the plurality of Wi-Fi- and GPS-enabled mobile devices operated by the first and third users.

29. The method of claim 16, wherein in each of the first and second Wi-Fi- and GPS-enabled mobile devices, the Wi-Fi scanner is equipped or collocated with the GPS device such that position data provided by the GPS device is considered position data for the Wi-Fi scanner.

30. The method of claim 16, further comprising enabling a plurality of Wi-Fi- and GPS-enabled mobile devices operated by a plurality of different users to contribute to the collaborative database, the plurality of Wi-Fi- and GPS-enabled mobile devices including the first and second Wi-Fi- and GPS-enabled mobile devices.

* * * * *